United States Patent
Hicks et al.

(10) Patent No.: US 12,090,971 B2
(45) Date of Patent: *Sep. 17, 2024

(54) APPARATUS AND METHOD FOR LOWERING AND RAISING A TRAILER

(71) Applicant: SAF-Holland, Inc., Muskegon, MI (US)

(72) Inventors: William J. Hicks, Muskegon, MI (US); Andrew L. Wallner, Grand Rapids, MI (US); David Sun, Placentia, CA (US); Tianyu Ling, Allegan, MI (US); Patrick Salois, Muskegon, MI (US); Brian M. Collins, Grand Rapids, MI (US)

(73) Assignee: SAF-Holland, Inc., Muskegon, MI (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/342,194

(22) Filed: Jun. 27, 2023

(65) Prior Publication Data
US 2023/0339437 A1 Oct. 26, 2023

Related U.S. Application Data

(63) Continuation of application No. 17/381,905, filed on Jul. 21, 2021, now Pat. No. 11,787,372, which is a
(Continued)

(51) Int. Cl.
*B60S 9/08* (2006.01)
*F16H 1/22* (2006.01)
(Continued)

(52) U.S. Cl.
CPC ............... *B60S 9/08* (2013.01); *F16H 1/22* (2013.01); *F16H 1/222* (2013.01); *F16H 3/66* (2013.01);
(Continued)

(58) Field of Classification Search
CPC ...... B60S 9/00; B60S 9/04; B60S 9/12; B60S 9/18; B60S 9/20
See application file for complete search history.

(56) References Cited

U.S. PATENT DOCUMENTS 11,148,645 B2 * 10/2021 Hicks ..................... F16H 1/22
11,787,372 B2 * 10/2023 Hicks ..................... F16H 1/22
254/419

(Continued)

*Primary Examiner* — Lee D Wilson
(74) *Attorney, Agent, or Firm* — Price Heneveld LLP

(57) ABSTRACT

A landing gear assembly includes a leg assembly including a first portion and a second portion, wherein the first and second portions of the leg assembly telescopingly engage one another, a gear assembly operably coupled to the first and second leg portions and configured to telescopingly move the first and second leg portions with respect to one another, the gear assembly including an input shaft, and a drive assembly coupled to the gear assembly comprising a gear arrangement configured to drive the drive shaft of the gear assembly at a first speed and at a second speed that is different than the first speed, an electric motor configured to drive the gear arrangement, and a battery configured to provide power to the motor.

21 Claims, 15 Drawing Sheets

Related U.S. Application Data continuation of application No. 16/128,701, filed on Sep. 12, 2018, now Pat. No. 11,148,645, which is a continuation-in-part of application No. 15/881,496, filed on Jan. 26, 2018, now abandoned.

(60) Provisional application No. 62/472,825, filed on Mar. 17, 2017, provisional application No. 62/451,434, filed on Jan. 27, 2017.

(51) Int. Cl.
    *F16H 3/66*       (2006.01)
    *F16H 25/20*     (2006.01)
    *F16H 37/04*     (2006.01)
    *H02K 7/116*     (2006.01)
    *H02K 11/00*     (2016.01)
    *H02K 11/28*     (2016.01)

(52) U.S. Cl.
    CPC ............. *F16H 25/20* (2013.01); *F16H 37/04* (2013.01); *H02K 7/116* (2013.01); *H02K 11/0094* (2013.01); *H02K 11/28* (2016.01); *F16H 2025/2065* (2013.01); *F16H 2025/2081* (2013.01); *F16H 2025/2084* (2013.01); *F16H 2025/2087* (2013.01); *F16H 2025/2093* (2013.01); *F16H 2200/0034* (2013.01); *F16H 2200/201* (2013.01)

(56) References Cited

U.S. PATENT DOCUMENTS

| | | | |
|---|---|---|---|
| 2015/0224838 A1* | 8/2015 | Laarman | B60S 9/08 |
| | | | 280/766.1 |
| 2016/0202111 A1 | 7/2016 | Fahey et al. | |
| 2017/0001603 A1 | 1/2017 | Chen et al. | |
| 2017/0120712 A1 | 5/2017 | Coombs et al. | |
| 2018/0141524 A1 | 5/2018 | Laarman et al. | |
| 2019/0009757 A1* | 1/2019 | Hicks | F16H 3/66 |
| 2019/0031157 A1* | 1/2019 | Sun | B60S 9/04 |
| 2019/0031159 A1* | 1/2019 | Sun | B60S 9/04 |
| 2021/0347339 A1 | 11/2021 | Hicks | |

\* cited by examiner

APPARATUS AND METHOD FOR LOWERING AND RAISING A TRAILER

RELATED APPLICATIONS

The present application is a continuation of U.S. patent application Ser. No. 17/381,905, filed Jul. 21, 2021, entitled "APPARATUS AND METHOD FOR LOWERING AND RAISING A TRAILER," now U.S. Pat. No. 11,787,372, which is a continuation of U.S. patent application Ser. No. 16/128,701, filed Sep. 12, 2018, entitled "APPARATUS AND METHOD FOR LOWERING AND RAISING A TRAILER," now U.S. Pat. No. 11,148,645, which is a continuation-in-part of U.S. patent application Ser. No. 15/881,496, filed Jan. 26, 2018, entitled "APPARATUS AND METHOD FOR LOWERING AND RAISING A TRAILER," now abandoned, which claims priority to U.S. Provisional Patent Application Ser. No. 62/451,434, filed on Jan. 27, 2017 and to U.S. Provisional Patent Application Ser. No. 62/472,825, filed on Mar. 17, 2017, each of which are incorporated herein by reference in their entirety and to which priority is claimed pursuant to 35 U.S.C. 120.

BACKGROUND

The embodiments as disclosed herein relate to the field of lift devices for semi-trailers, specifically a new and useful apparatus for raising and lowering a semi-trailer. The embodiments as disclosed herein further relate to a vehicle landing gear assembly, and in particular to a landing gear assembly configured to support a heavy-duty trailer when uncoupled from an associated towing vehicle such as a semi-tractor, and which is powered via an electric motor and/or via a manual input by an operator.

DESCRIPTION OF THE PRIOR ART

Semi-trucks and other cargo trucks are crucial for delivering goods and supplies to and from various ports and harbors or across the country. Indeed, semi-trailers not only transport goods throughout the country from distribution centers to warehouses, they are also used to perform the shipping logistics for an untold amount of businesses all over the globe. Typically, when a semi-truck arrives at its destination, a set of landing gear disposed on the underside of the semi-trailer portion are lowered to the ground and any air or electrical connections between the semi-trailer and the tractor unit are disconnected. The tractor unit is then free to move or drive away, leaving the semi-trailer stationary in place to be unloaded or loaded as needed.

Because shipping time can be critical, semi-trailers often need to be turned around in as short a period of time as possible. Therefore it is critical during the loading and unloading of semi-trailers that the landing gear are deployed as efficiently and smoothly as possible while also ensuring that the semi-trailer is placed in a safe, stable position while being loaded or unloaded. The landing gear attached to many semi-trailers principally comprises a retractable vertical support that may be raised or lowered by the turning or rotation of a crank or drive shaft. In most applications, the user first engages a handle to the crank or drive shaft that is coupled to the vertical support and then begins rotating the handle crank by hand, thereby lowering or extending the vertical support. The user continues to rotate the handle until the vertical support touches or nearly touches the ground. With the remaining connections between the semi-trailer and tractor unit removed, the tractor unit is driven away leaving the semi-trailer to rest on the ground via the landing gear. After reattaching the semi-trailer to the tractor unit, the user rotates the handle in the opposing direction to raise or retract the landing gear off of the ground and into or against the semi-trailer.

While the vertical support of the landing gear may be raised effectively using a handle or turn crank, it can be time consuming and physically difficult to perform when the shaft is not properly lubricated or when environmental conditions such as rain or extreme cold make it difficult for the user to exit the tractor unit and manually turn the crank shaft. Previous attempts to solve this problem have included landing gear which comprise a motor or other automated mechanical means which engage and rotate the shaft when the user activates a push button or other initializing means. However, motorized actuators or the like do not allow for any alternative means for directly rotating the drive shaft in the event that the motorized actuator breaks down or fails. Instead, if the motorized actuator fails, the user must open the casing or housing of the actuator, insert a specialized tool into the gear assembly of the actuator, and then manually rotated the gears which in turn rotates the drive shaft. Turning the gear assembly directly however is extremely time consuming and may be more labor intensive then turning the drive shaft via a traditional handle.

What is needed therefore is an automated means for expanding or extending and retracting the landing gear of a semi-trailer which is efficient and safe to use, yet provides a reliable and easy to use backup means for expanding or extending and retracting the landing gear should the automated means fail.

SUMMARY OF THE INVENTION

An embodiment as shown and described herein may include a landing gear assembly that includes a leg assembly including a first portion and a second portion, wherein the first and second portions of the leg assembly telescopingly engage one another, a gear assembly operably coupled to the first and second leg portions and configured to telescopingly move the first and second leg portions with respect to one another, the gear assembly including an input shaft, and a drive assembly coupled to the gear assembly comprising a gear arrangement configured to drive the drive shaft of the gear assembly at a first speed and at a second speed that is different than the first speed, an electric motor configured to drive the gear arrangement, and a battery configured to provide power to the motor.

Another embodiment as shown and described herein may further or alternatively include a landing gear assembly including a leg assembly including an attachment member configured to attach the leg assembly to a frame assembly of a vehicle, and a supporting member configured to abut a ground surface, and a drive assembly that includes a gear arrangement operably coupled to the leg assembly, wherein the drive assembly is operable between a first configuration where the drive assembly moves the supporting member toward or away from the attachment member at a first speed and the frame assembly of the vehicle moves toward or away from the ground surface at the first speed, and a second configuration where the drive assembly moves the supporting member toward or away from the attachment member at a second speed that is different from the first speed and the frame assembly moves toward or away from the ground surface at the second speed, and wherein the drive assembly is configured to automatically switch between the first and second configurations based on a predetermined parameter and without input from a user.

Yet another embodiment as shown and described herein may further or alternatively include a landing gear assembly including a leg assembly including a first leg portion and a second leg portion movable with respect to the first leg portion, a drive assembly including a motor configured to move the second leg portion with respect to the first leg portion, a manual input receiver configured to receive a handle allowing manual movement of the second leg portion with respect to the first leg portion by an operator via the handle, and an actuator arrangement movable by an operator between a first position where the motor is coupled with the leg assembly such that operation of the motor moves the second leg portion with respect to the first leg portion, and a second position where the motor is uncoupled from the leg assembly such that operation of the motor does not move the second leg portion with respect to the first leg portion.

The principal objects of the embodiments as disclosed herein are to provide a durable landing gear assembly which may be utilized to support and lift an associated vehicle such as a heavy-duty trailer via a self-contained, battery-powered drive assembly, and/or via a manually driven input arrangement, the present inventive landing gear assembly is efficient in use, capable of a long operating life, and is particularly well adapted for the proposed use.

These and other features, advantages, and objects of the present invention will be further understood and appreciated by those skilled in the art by reference to the following specification, claims, and appended drawings.

DETAILED DESCRIPTION OF PREFERRED EMBODIMENT

Figure 1:
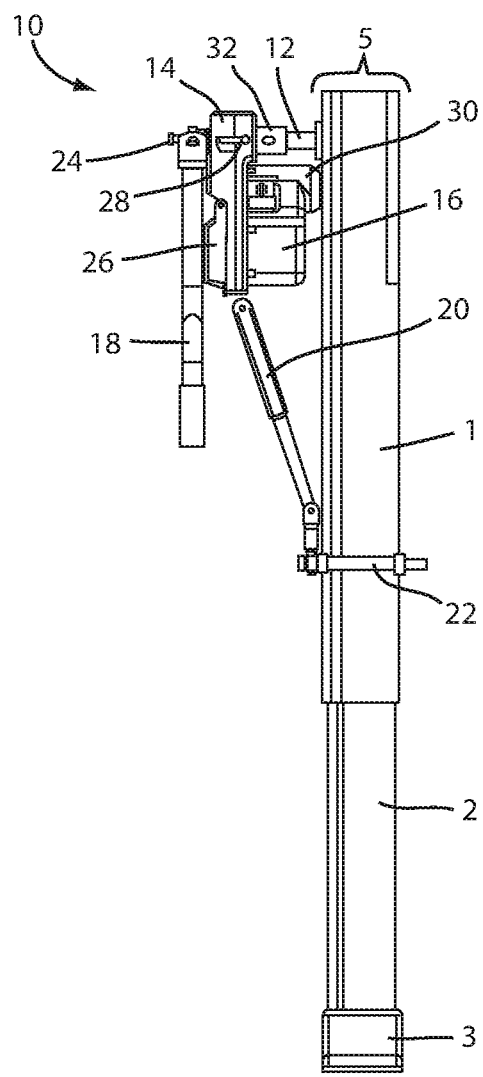
FIG. 1 is a rear elevation view of a dual drive mechanism coupled to a leg of a landing gear that forms a part of a semi-trailer.
Figure 8:
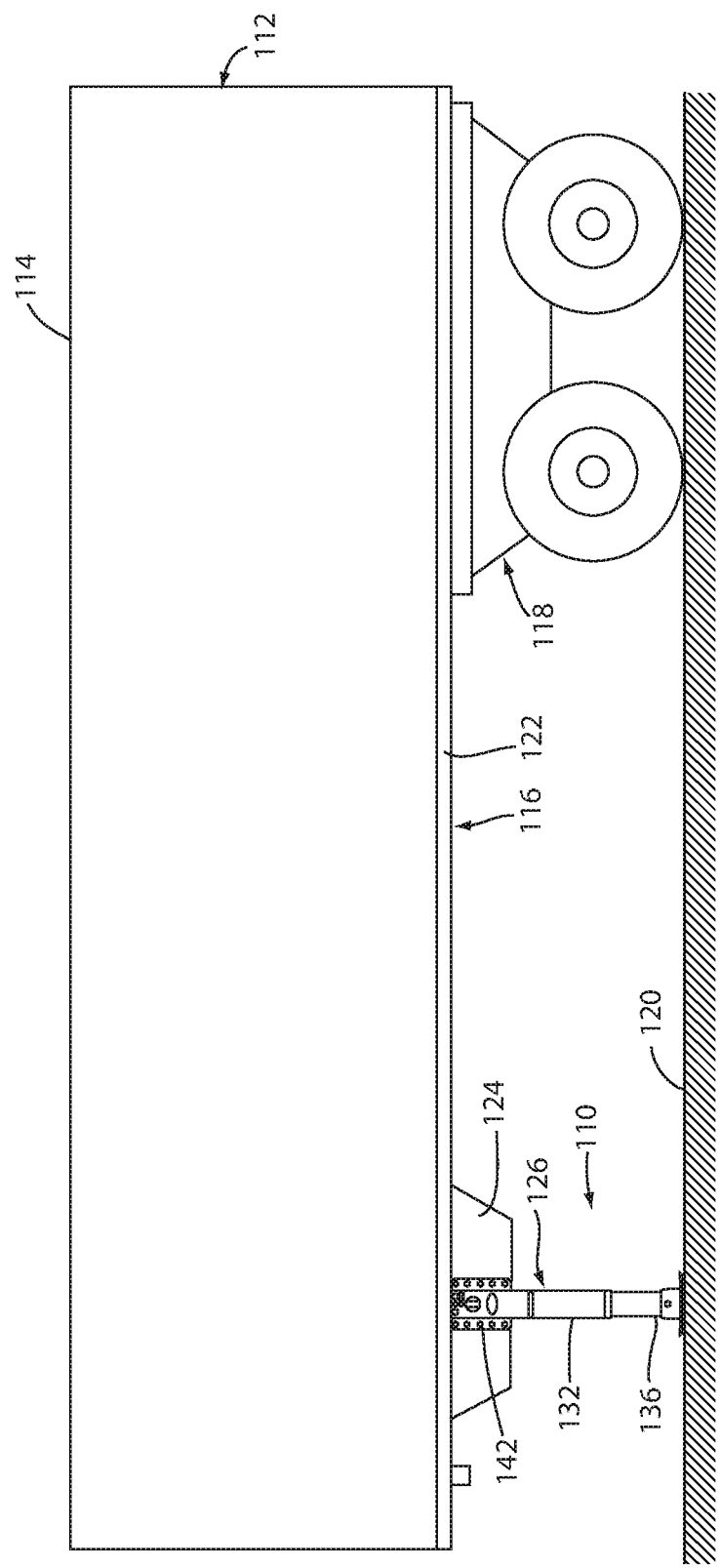
FIG. 8 is a side elevation view of a heavy-duty trailer assembly including an alternative embodiment of the landing gear assembly.
Figure 9:
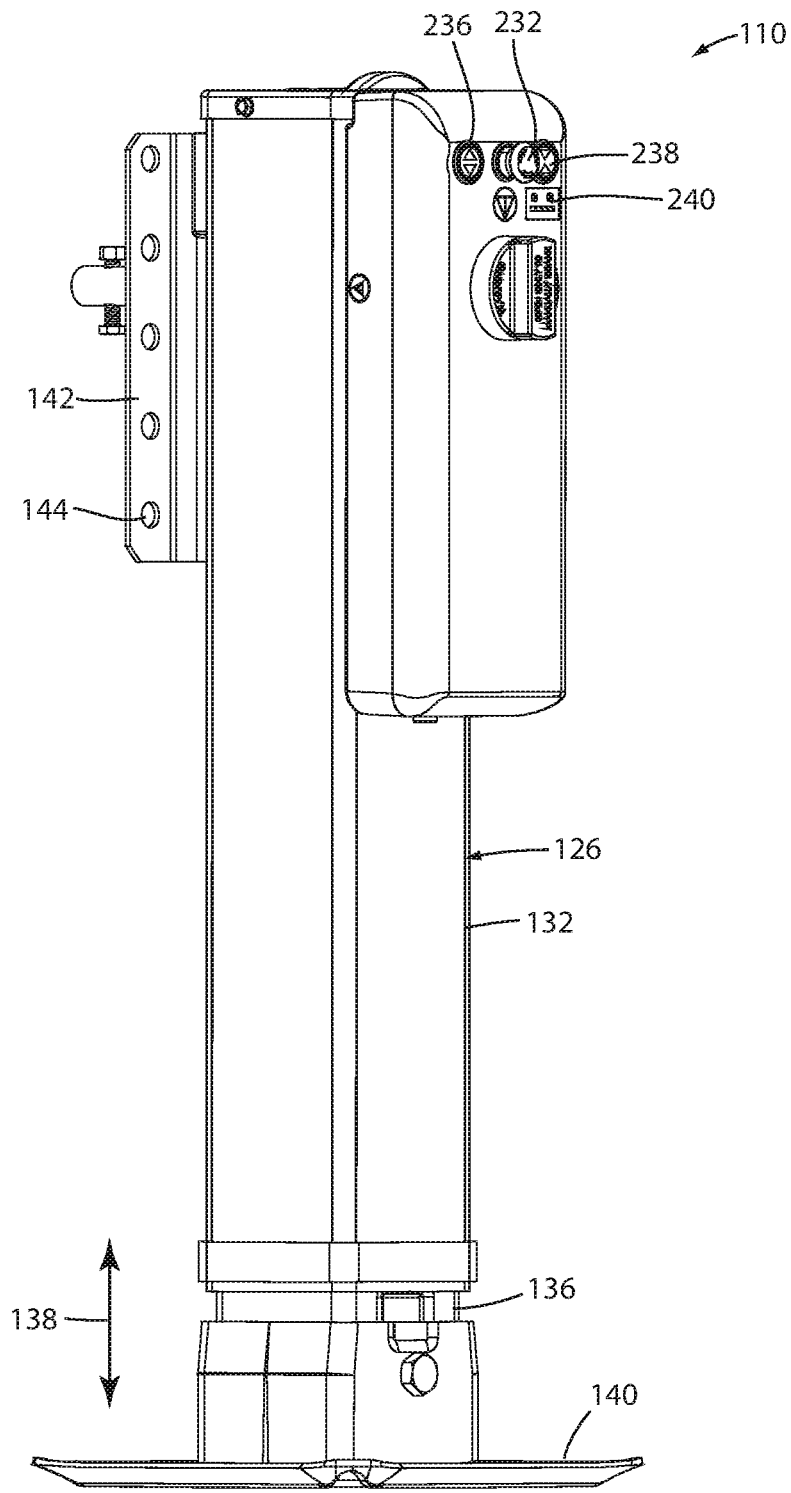
FIG. 9 is a front perspective view of the landing gear assembly of FIG. 8.

For purposes of description herein, the terms "upper," "lower," "right," "left," "rear," "front," "vertical," "horizontal," and derivatives thereof shall relate to the invention as oriented in FIGS. 1, 8 and 9. However, it is to be understood that the invention may assume various alternative orientations, except where expressly specified to the contrary. It is also to be understood that the specific devices and processes illustrated in the attached drawings, and described in the following specification are simply exemplary embodiments of the inventive concepts defined in the appended claims. Hence, specific dimensions and other characteristics relating to the embodiments disclosed herein are not to be considered as limiting, unless the claims expressly state otherwise.

A dual drive mechanism or drive assembly denoted generally by reference numeral 10 is shown in FIG. 1 coupled to a leg or leg assembly 5 of a landing gear or landing gear assembly disposed underneath a semi-trailer. As seen in FIG. 1, the leg 5 comprises an upper portion or upper leg portion 1 and a lower portion or lower leg portion 2 which telescopes in and out of the upper portion 1. Disposed at the distal or lower end of the lower portion 2 is a foot 3 which makes contact with the ground when the lower portion 2 has been fully extended. Also coupled to the leg 5 is a drive or input shaft 12 which, when rotated, will either raise or lower the telescoping lower portion 2 according to the direction in which the drive shaft 12 is rotated as is known in the art. The drive shaft 12 may only be coupled to a single leg 5 as depicted in FIG. 1, or alternatively, may be coupled to multiple legs 5 of the landing gear. Additionally, while FIG. 1 shows the landing gear of the semi-trailer comprising a telescopic leg 5, it is to be expressly understood that additional or different configurations of landing gear now known or later devised which may be actuated by the rotation of a drive shaft may be used with the current device without departing from the original spirit and scope of the invention.

Figure 2:
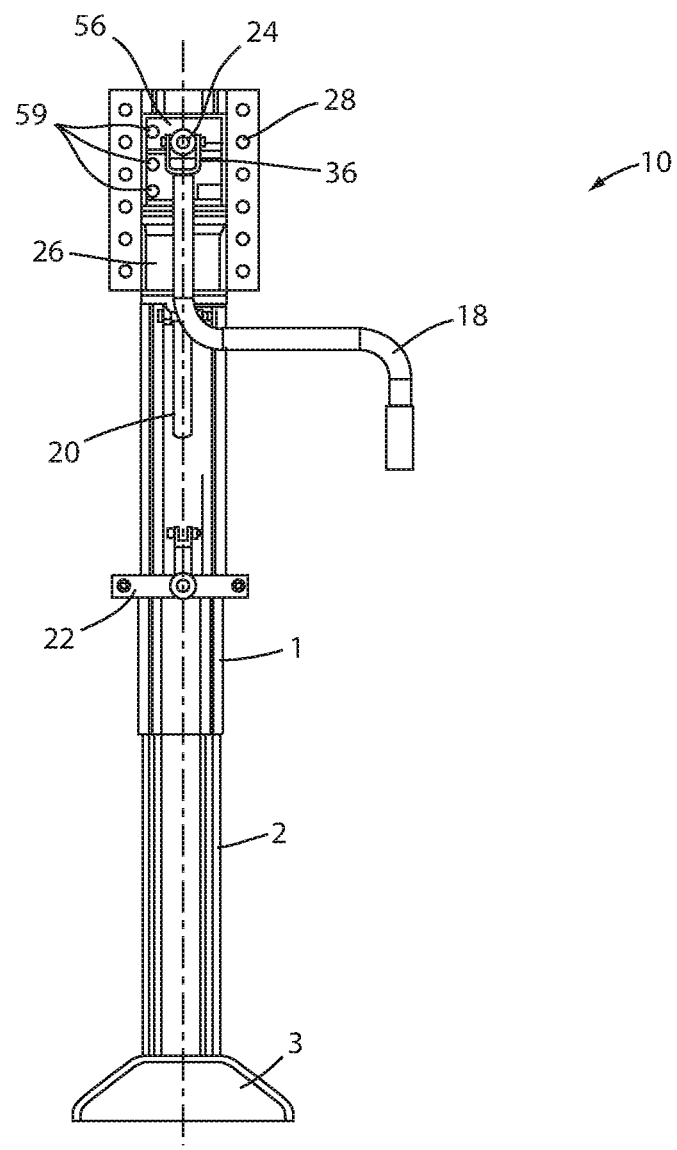
FIG. 2 is a side elevation view of the dual drive mechanism of FIG. 1.

The dual drive mechanism 10 seen in FIGS. 1 and 2 includes a gearbox 14, a motor housing 30, a battery housing 16, and a manual handle 18. The drive shaft 12 of the landing gear is inserted into the gearbox 14 through a drive shaft aperture 32 and into a distal portion 44 of a handle shaft 24 as seen in FIGS. 3B and 4. The drive shaft 12 is locked into place within the draft shaft aperture 32 and the handle shaft 24 via a removable pin 60 which is received through both the drive shaft 12 and the handle shaft 24. Disposed on the opposing side of the gearbox 14 and coaxial relative to the drive shaft 12 is a hexagonal handle shaft 24 which extends perpendicularly relative to the outward facing surface of the gearbox 14. Coupled to an end of the handle shaft 24 in turn is the manual handle 18 via a rotatable U-shaped joint 36. The gearbox 14 further comprises a shift lever 28 which extends outwardly from the gearbox 14 as seen in FIGS. 2 and 4. Integrally formed with the gearbox 14 is the motor housing 30 and the battery housing 16 which house or accommodate the motor components and the battery, respectively, which are described in further detail below. In addition to the drive shaft 12 being inserted into the gearbox 14, the dual drive mechanism 10 is further coupled to the leg 5 by a brace 20 which is coupled to a bottom portion of the battery housing 16 at one end and to a bracket 22 at its opposing end. The bracket 22 is coupled to the upper portion 1 of the leg 5 via a standard set of bolts or other fasteners as is known in the art. The brace 20 provides additional structural support to the dual drive mechanism 10 as well as prevents extraneous movement of the dual drive mechanism 10 while it is applying torsion forces to the drive shaft 12. The brace 20 additionally comprises a telescoping length which allows the brace 20 to be coupled to the bracket 2 at a variety of positions or heights along the upper portion 1 of the leg 5.

Figure 3A:
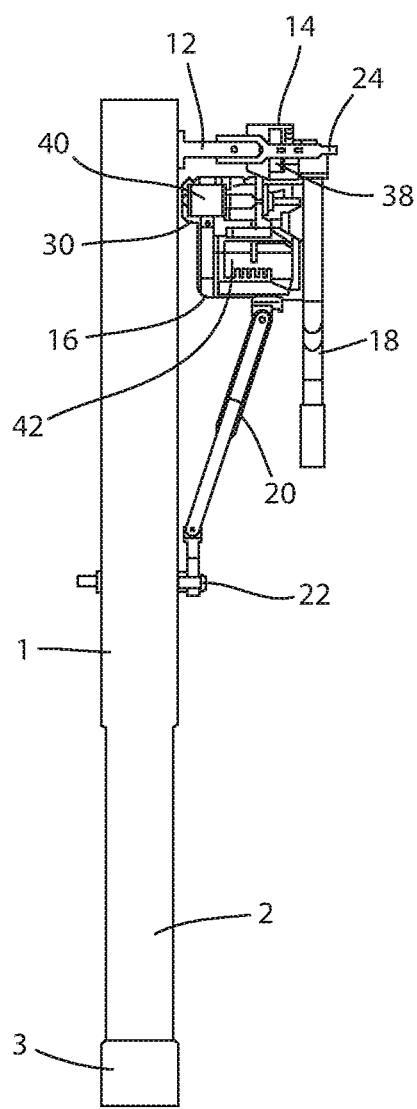
FIG. 3A is a front elevation cross-sectional view of the dual drive mechanism of FIG. 1.
Figure 3B:
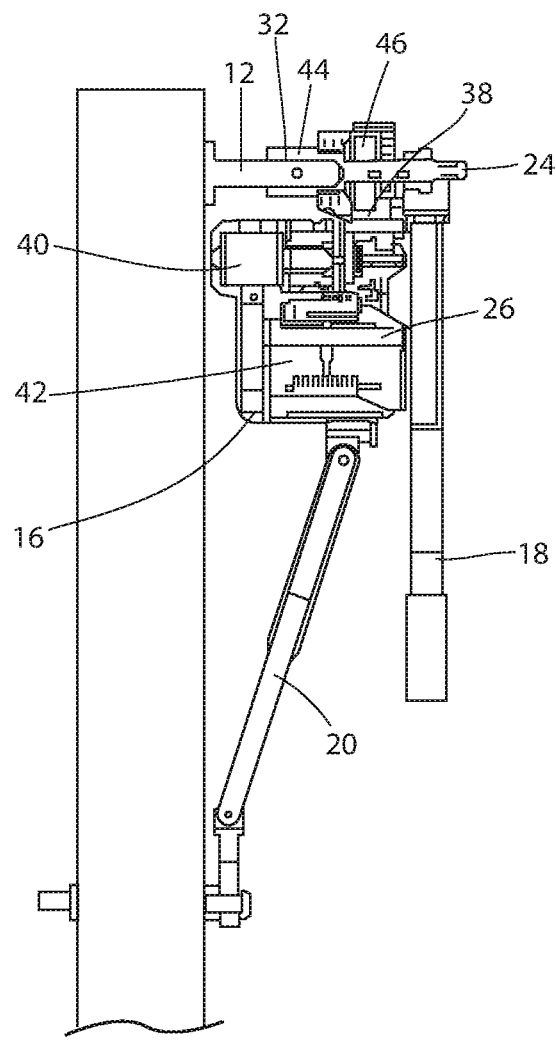
FIG. 3B is an enlarged front elevation cross-sectional view of the dual drive mechanism of FIG. 3A.
Figure 4:
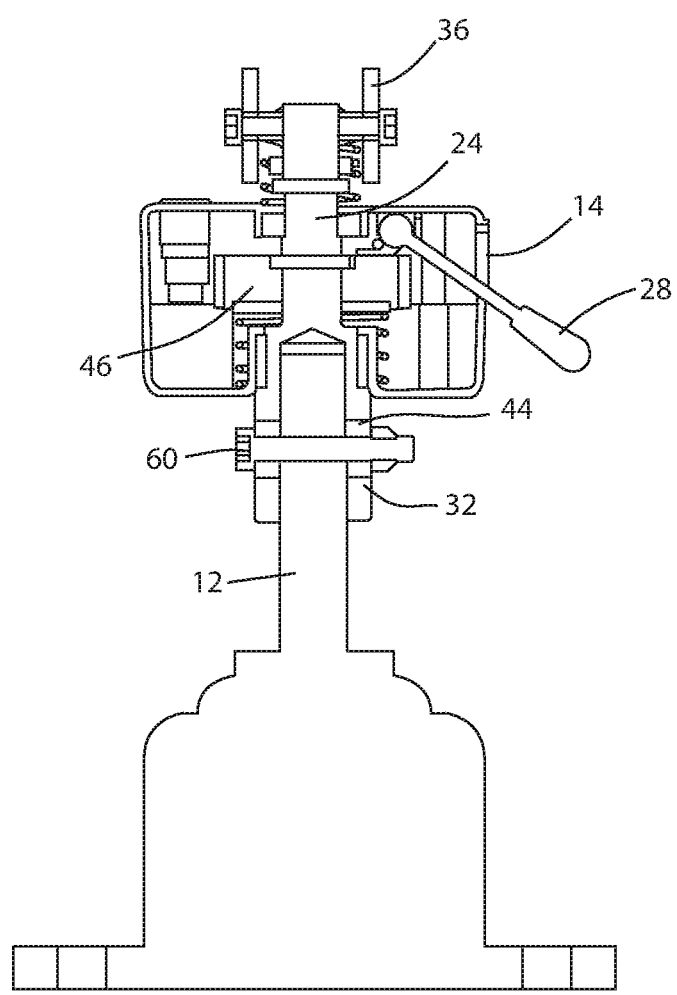
FIG. 4 is a top plan cross-sectional and partial schematic view of the dual drive mechanism of FIG. 1.

The internal components of the dual drive mechanism 10 may be had by turning to FIGS. 3A and 3B which shows a side cross-sectional view of the device. The battery housing 16 accommodates or houses a removable battery 42 which is inserted into the battery housing 16 through a removable access door 26. The battery 42 is also rechargeable, thus allowing a user to remove the battery 42 from the battery housing 16, recharge it, and then reinsert it into the battery housing 16. The motor 40 within the motor housing 30 is preferably an electric motor that receives power from the removable battery 42 and in turn actuates a gear assembly 38 disposed in the gearbox 14 when activated. The gear assembly 38 through a series of interlocking or meshed gears in turn actuates or rotates a collar 46 of an actuator arrangement that is disposed circumferentially or partially circumferentially about the handle shaft 24. When the collar 46 is coupled to or making contact with the handle shaft 24, the rotational movement of the collar 46 translates to the handle shaft 24 which in turn rotates the drive shaft 12 thus raising or lowering the landing gear of the semi-trailer accordingly. Specifically, as seen in the exploded view of FIG. 6, the motor 40 is positioned with its axis parallel to the drive shaft 12. The gear assembly 38 is preferably a worm reduction gear assembly, however, other known configurations such as planetary gears, spur gear reduction, or chain drives may be used so as to provide the collar 46 with sufficient torsional or rotational force for rotating the handle shaft 24.

Greater detail of the shift lever 28 and the ability of the dual drive mechanism 10 to switch between means for driving the drive shaft 12 may be had by turning to FIG. 4. The shift lever 28 is disposed within the gearbox 14 and adjacent to the collar 46. When the shift lever 28 is in a neutral position seen in FIG. 4, the collar 46 is allowed to make contact with the handle shaft 24 and rotate it which in turn rotates the drive shaft 12. However, by manipulating the shift lever 28 and moving it into an actuated position, the distal portion of the shift lever 28 lifts or moves the collar 46 off of or away from the handle shaft 24, thereby stopping any translation or movement between the collar 46 and the handle shaft 24. With the collar 46 removed from the handle shaft 24 it can be appreciated that even if the motor 40 and gear assembly 38 continues to rotate the collar 46, the handle shaft 24 will not rotate and any further movement of the drive shaft 12 by the motorized gear assembly 38 and collar 46 will be prevented. Rotation of the handle shaft 24 and the drive shaft 12 may be resumed however if the shift lever 28 is shifted back into the neutral position, thus bringing the collar 46 back into contact with the drive shaft 12. It can be seen therefore that the process of driving the drive shaft 12 by the motorized movement of the collar 46 may then be optionally turned on and off via the manipulation or actuation of the shift lever 28.

In addition to driving the drive shaft 12 via the motor 40, gear assembly 38, and collar 46 as described above, the drive shaft 12 may also be driven by the standard handle or manual handle or turn crank 18. To do so, a user first makes sure that the shift lever 28 is in the actuated position, thereby ensuring that that collar 46 is moved up or off of the handle shaft 24. The handle 18 is then rotated upward until the U-shaped joint 36 is coaxial or parallel with the handle shaft 24. The handle 18 and its corresponding U-shaped joint 36 are then pushed inward towards the drive shaft 12, thereby engaging the U-shaped joint 36 with a distal end of the handle shaft 24. The user may rotate the handle 18 by hand. Rotation of the handle 18 rotates the handle shaft 24 which in turn rotates the drive shaft 12 thus raising or lowering the landing gear of the semi-trailer. Because the collar 46 is disengaged from the handle shaft 24 by the shift lever 28, both the handle shaft 24 and the drive shaft 12 are free to rotate without any interference or resistance from the gear assembly 38 or the motor 40. Because the gear assembly 38 and motor 40 are not in use while the handle 18 is being rotated, any damage to the gear assembly 38 by the forced rotation of the handle shaft 24 is prevented and any need for the user rotating the drive shaft 12 to also rotate the gears within the gear assembly 38 is eliminated. To decouple the handle 18, the user pulls the handle 18 and the U-shaped joint 36 away from the drive shaft 12 and then lets the handle 18 rotate back down towards its resting position seen in FIGS. 1-3B.

Figure 5:
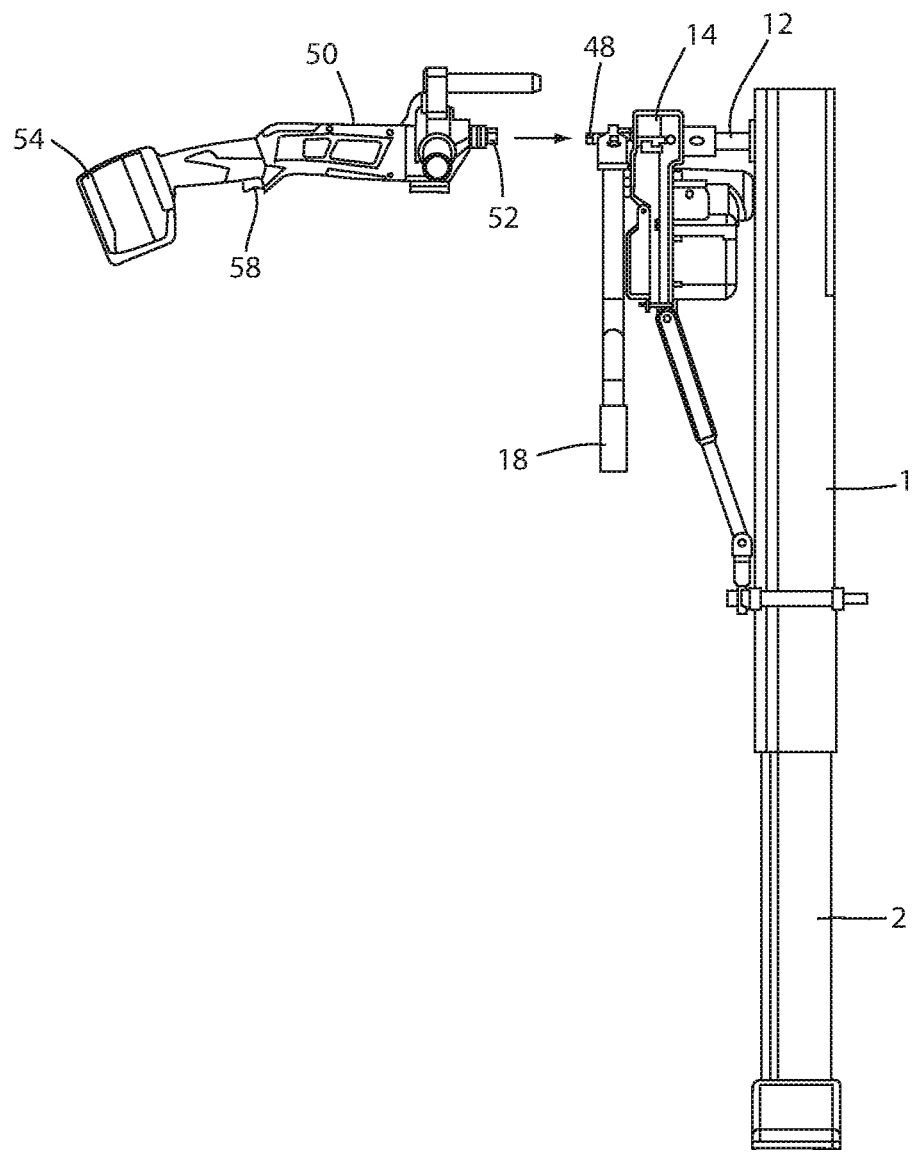
FIG. 5 is a rear elevation view of an alternative embodiment of the dual drive mechanism comprising a hand tool which may be coupled to a handle shaft of a dual drive mechanism.
Figure 6:
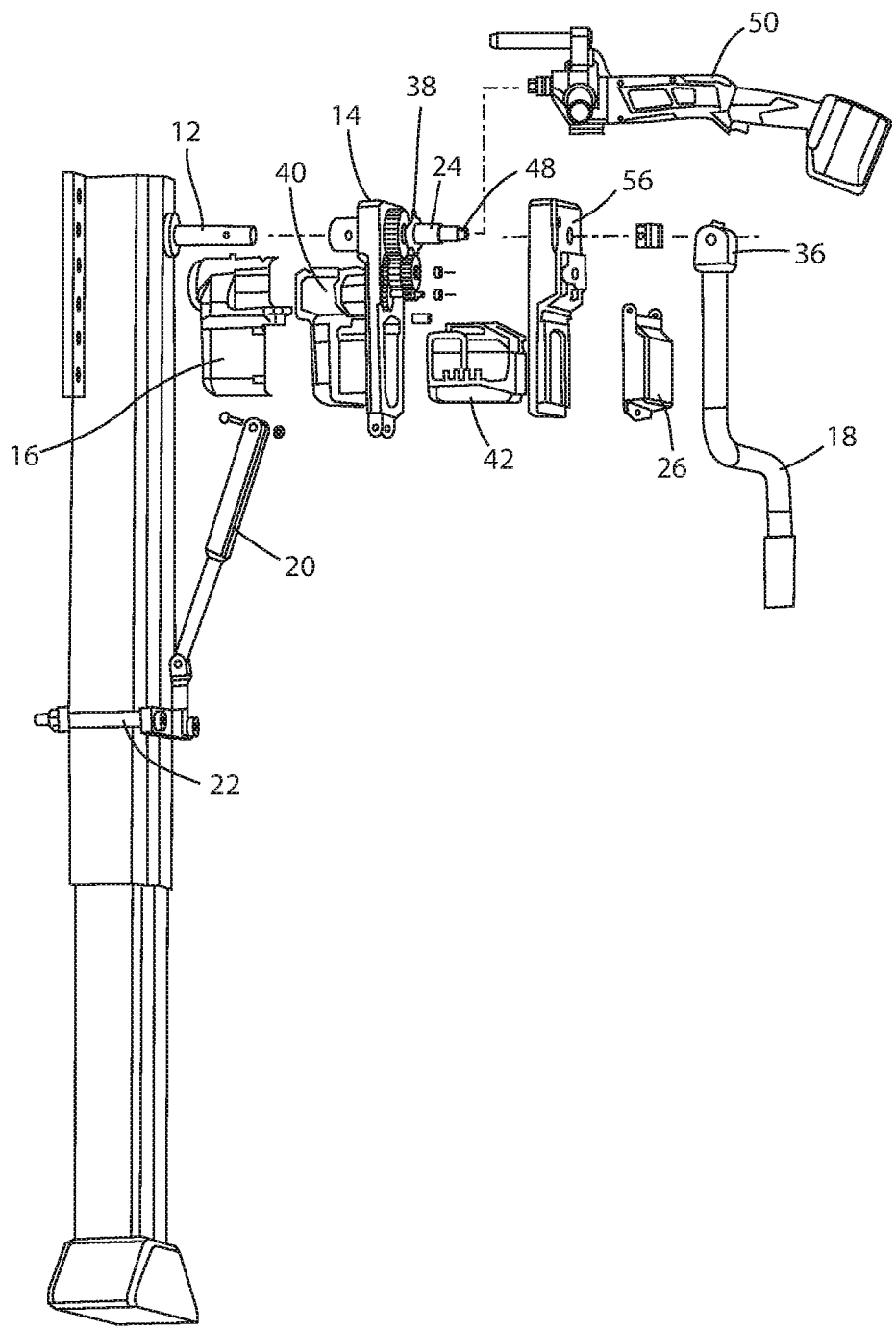
FIG. 6 is an exploded front perspective view of the dual drive mechanism of FIG. 5.

A third means for rotating the drive shaft 12 of the landing gear may be had by turning to FIGS. 5 and 6. In this embodiment, the handle shaft 24 comprises a substantially hexagonal surface of tip 48. With the shift lever 28 in the actuated position, an electric hand tool 50 comprising a substantially hexagonal aperture 52 may be pressed against the handle shaft 24 until the hexagonal tip 48 enters the hexagonal aperture 52. The hand tool 50 may then be activated through the compression of a trigger 58 or other equivalent activation means which then begins to rotate the handle shaft 24 through the coupling formed by the hexagonal aperture 52 and tip 48. The rotational movement of the handle shaft 24 is then translated to the drive shaft 12. The hand tool 50 may rotate or spin the drive shaft 12 in either the clockwise or the counterclockwise orientation as is known in the art. Similar to the previous embodiment discussed above, the rotation of the handle shaft 24 by the hand tool 50 in turn rotates the drive shaft 12 which raises or lowers the landing gear of the semi-trailer accordingly. Because the collar 46 is disengaged from the handle shaft 24 by the shift lever 28, both the handle shaft 24 and the drive shaft 12 are free to rotate without any interference or resistance from the gear assembly 38 or the motor 40. To disengage the hand tool 50, the user pulls the hand tool 50 away from the drive shaft 12 and removes the hexagonal tip 48 from the aperture 52. The user may recouple the hand tool 50 if necessary or alternatively, continue to rotate the drive shaft 12 by means of the handle 18 or the motorized gear assembly 38 as discussed above. The hand tool 50 is preferably powered by a rechargeable battery 54 that is separate from the battery 42 used to power the motor 40.

To use the dual drive mechanism 10, the user approaches a user interface or face plate 56 that forms a frontal surface of the gearbox 14. As seen in FIG. 2, the user interface 56 comprises a plurality of push buttons, switches, display screens, or other means 59 for inputting commands into the dual drive mechanism 10. The user first ensures that the shift lever 28 is in the neutral position and therefore the collar 46 is in contact or otherwise engaged with the handle shaft 24. The user may then activate the dual drive mechanism 10 by manipulation of the plurality of input means 59. Specifically, the user may first turn on the dual drive mechanism 10 and then instruct the dual drive mechanism 10 to expand or extend or retract the landing gear of the semi-trailer by actuation of the appropriate input means 59. For example, if the user wishes to extend or lower the lower portion 2 of the legs 5, the user pushes a "down" button which is part of the input means 58 disposed on the user interface 56. The motor 40 then begins to turn the gear assembly 38 and collar 46 which in turn begins to rotate the handle shaft 24 in the direction corresponding to the user's input command. As discussed above, the handle shaft 24 translates its rotational movement to the drive shaft 12 which in turn lowers the lower portion 2 and foot 3. The motorized gear assembly 38 and collar 46 continually rotates the drive shaft 12 for as long as the user depresses or actuates the input means 59, until the foot 3 makes contact with the ground or other object, or alternatively, for a predetermined amount of time as dictated by an internal memory or microcontroller disposed within the user interface 56 as is known in the art. With the lower portion 2 of the leg 5 fully extended, the user may lower a different leg 5 if needed using the same dual drive mechanism 10, or alternatively, using a different dual drive mechanism 10 corresponding to each of the legs 5 within the landing gear of the semi-trailer. Once all of the legs 5 of the landing gear of the semi-trailer are lowered, the user may then couple or decouple the tractor unit from the semi-trailer.

To raise or contract the lower portion 2 of the leg 5 and raise the foot 3 from the ground, the user pushes an "up" button which is part of the input means 59 disposed on the user interface 56. The motor 40 then begins to turn the gear assembly 38 and collar 46 which in turn rotates the handle shaft 24 in the direction corresponding to the user's latest input command. It can be appreciated that the motorized gear assembly 38 and collar 46 will turn the handle shaft 24 and drive shaft 12 in two separate directions, namely a direction which corresponds to the user actuating the "down" input means 59 and a different direction which corresponds to the user actuating the "up" input means 59. The rotation of the drive shaft 12 lifts or retracts the lower portion 2 into the upper portion 1 of the leg 5 as is known in the art. The motorized gear assembly 38 and collar 46 continually rotates the drive shaft 12 in the selected direction for as long as the user depresses or actuates the input means 59 until the lower portion 2 is fully nested within the upper portion 1, or alternatively, for a predetermined amount of time as dictated by an internal memory or microcontroller disposed within the user interface 56 as is known in the art.

To enhance the stability of the dual drive mechanism 10, the user may also couple the bracket 22 using a bolt or other traditional fixture means at a desired height of the upper portion 1 of the leg 5. The brace 20 coupled to the bottom of the dual drive mechanism 10 is then coupled to the bracket 22 by inserting a distal portion of the brace 20 into the bracket 22. The brace 20 may then be locked into position within the bracket 22 by the adjustment of a wing nut, thumb screw, or other equivalent means. Because the brace 20 comprises a telescoping length, the brace 20 may be extended or retracted to nearly any position along the upper portion 1 of the leg 5 where the bracket 22 may be located. Additionally, should the bracket 22 need to be moved to another location along the upper portion 1, the brace 20 may be decoupled and have its length adjusted according to the new position of the bracket 22.

To recharge the dual drive mechanism 10, the user accesses the battery housing 16 by opening an access door 26 of the housing 16. The battery 42 may then be slid outwards out of the battery housing 16 and then installed or coupled to a battery charger or charging station currently known in the art. After being sufficiently charged, the battery 42 may be slid back into the battery housing 16 until sufficient contacts between the battery 42 and the internal electronics of the dual drive mechanism 10 have been established.

Should the motor 40, gear assembly 38, and/or battery 42 break or otherwise fail, the user has the option of switching to an alternative means for driving the drive shaft 12 and then continue to raise or lower the landing gear of the semi-trailer as needed. Upon the detection of the failed motor 40, gear assembly 38, battery 42, or other components of the dual drive mechanism 10, the user changes the means in which the drive shaft 12 is driven by moving the shift lever 28 into the actuated position which moves the collar 46 off of the handle shaft 24 as discussed above. In one embodiment, the handle 18 may be engaged by bringing it upwards and coupling it to the handle shaft 24. The handle 18 is then rotated in the same direction so as to continue the original movement of the landing gear. Alternatively, after moving the shift lever 28 into the actuated position, the user may instead couple the hand tool 50 to the handle shaft 24 via the aperture 52 and continue to drive the drive shaft 12 by actuation of the hand tool 50. Regardless if either the handle 18 or the hand tool 50 is used however, rotation of the drive shaft 12 is accomplished without the need of also actuating the gear assembly 38 and collar 46 by hand, thus making the process of raising or lowering the landing gear of the semi-trailer more efficient and easier to perform. Because the shift lever 28 selectively engages the motorized gear assembly 38 to the handle shaft 24 at the direction of the user, the user may choose to use the handle 18 and/or the hand tool 50 at any time when lowering or raising the lower portion 2 of the leg 5. It is in this fashion therefore that the landing gear of the semi-trailer may be raised or lowered should the motorized gear assembly 38 or other component of the dual drive mechanism 10 fail, or for when environmental conditions do not permit electronic operation of the dual drive mechanism 10.

Figure 7:
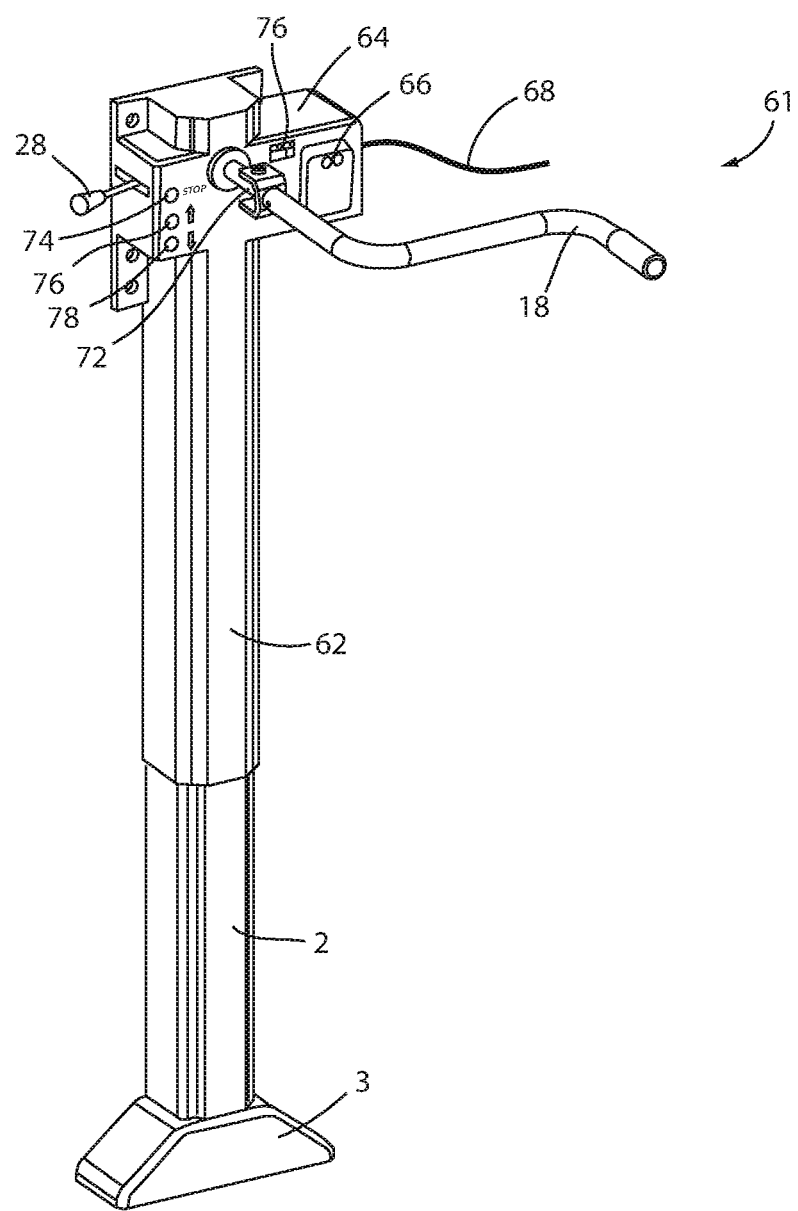
FIG. 7 is a front perspective view of another alternative embodiment of a dual drive mechanism, where the dual drive mechanism is incorporated within a structure of an upper portion of a landing gear.

An alternative embodiment of the dual drive mechanism 61 may be seen in FIG. 7 where a motor housing 64 of the dual drive mechanism 61 is incorporated in the structure of the upper portion 62 of the landing gear itself. Here, the drive shaft of the landing gear is disposed within the upper portion 62 and coupled to the handle shaft 72 which protrudes from the face of the motor housing 64. A shift lever 28 is disposed on one lateral side of the motor housing 64 which, like in the previous embodiment described above, cooperates with the internal components of the motor housing 64 similar to what is seen in FIGS. 3B, 4A and 6 to alternate the drive function of the device. The front face of the motor housing 64 further comprises a battery indicator light 70, an "up" button 76, a "down" button 78, and a "stop" or "off" button 74. A display screen 66 is also optionally disposed within the front face of the motor housing 64. Additionally, a wire 68 is coupled to the dual drive mechanism 61 at one end and to the electronics of the tractor unit at the opposing end. When the wire 68 is properly connected and when the tractor unit is activated or in use as is known in the art, the wire 68 charges a rechargeable and removable battery disposed within the motor housing 64 of the dual drive mechanism 61.

To raise or contract the lower portion 2 of the leg 5 and raise the foot 3 from the ground using the embodiment seen in FIG. 7, the user pushes the "up" button 76 which then activates a motor within the motor housing 64 and begins to turn a gear assembly and collar which in turn rotates the handle shaft 72 in the direction corresponding to the user's latest input command. It can be appreciated that the motorized gear assembly and collar will turn the handle shaft 72 and drive shaft in two separate directions, namely a direction which corresponds to the user actuating the "down" button 78 and a different direction which corresponds to the user actuating the "up" button 76. The rotation of the drive shaft lifts or retracts the lower portion 2 into the upper portion 1 of the leg 5 as is known in the art. The motorized gear assembly and collar continually rotates the drive shaft in the selected direction for as long as the user depresses or actuates the "up" button 76, until the lower portion 2 is fully nested within the upper portion 62, or alternatively, for a predetermined amount of time as dictated by an internal memory or microcontroller disposed within the motor housing 64 as is known in the art.

Should the motor, gear assembly, and/or battery break or otherwise fail, the user has the option of switching to an alternative means for driving the drive shaft and then continue to raise or lower the landing gear of the semi-trailer as needed. Upon the detection of the failed motor, gear assembly, battery, or other component of the dual drive mechanism 61, the user changes the means in which the drive shaft is driven by moving the shift lever 28 into the actuated position which moves the collar off of the handle shaft 72 as discussed above. In one embodiment, the handle 18 may be engaged by bringing it upwards and coupling it to the handle shaft 72. The handle 18 is then rotated in the same direction so as to continue the original movement of the landing gear. It can be seen therefore that because the shift lever 28 moves the collar off of the handle shaft 72, the rotation of the drive shaft is accomplished without the need of also actuating the gear assembly and collar by hand, thus making the process of raising or lowering the landing gear of the semi-trailer more efficient and easier to perform. Because the shift lever 28 selectively engages the motorized gear assembly to the handle shaft 72 at the direction of the user, the user may choose to use the handle 18 and/or other suitable hand tool at any time when lowering or raising the lower portion 2 of the leg 5. It is in this fashion therefore that the landing gear of the semi-trailer may be raised or lowered should the motorized gear assembly or other component of the dual drive mechanism 61 fail, or for when environmental conditions do not permit electronic operation of the dual drive mechanism 61.

It can further be seen that since the dual drive mechanism 61 as seen in FIG. 7 is incorporated into the structure of the upper portion 62 of the landing gear, a sufficiently strong and stable coupling between the moving components of the dual drive mechanism 61 and the remaining portions of the landing gear is achieved and no additional braces or support structures are required.

The reference numeral 110 (FIG. 8) generally designates another embodiment of the landing gear assembly configured to support a heavy-duty vehicle such as a semi-trailer 112 when the trailer 112 is not supported by an associated towing vehicle such as a semi-truck (not shown). In the illustrated example, the semi-trailer 112 includes a cargo-housing container or body 114 supported by a vehicle frame assembly 116, a suspension arrangement 118, and a pair of the landing gear assemblies 110, wherein the landing gear assemblies 110 are spaced from one another on opposite sides of the trailer 112 and extend downwardly between the frame assembly 116 and a ground surface 120. The vehicle frame assembly 116 may include a plurality of longitudinally-extending frame members 122 and mounting plates 124 fixedly secured to the frame members 122 and extending downwardly therefrom. The landing gear assembly 110 is preferably configured to generate a lifting force of at least 45,000 lbs., and more preferably of greater than 65,000 lbs.

In the illustrated example, each landing gear assembly 110 (FIGS. 8 and 9) includes a leg assembly 126, a gear assembly 128 located internally to the leg assembly 126, and a dual drive mechanism or drive assembly 130 that may be located externally to the leg assembly 126. The leg assembly 126 includes an upper portion or upper leg portion 132 defining an internal space 134 that houses the gear assembly 128, and a lower portion or lower leg portion 136 that is telescopingly received within the upper leg portion 132 such that the lower leg portion 136 is telescopingly movable in the direction 138 relative to the upper leg portion 132. In the illustrated example, the lower leg portion 136 is pivotably coupled to a foot or supporting member 140 configured to abut the ground surface 120 when the landing gear assembly 110 is in an extended position. A hat-shaped mounting bracket 142 is fixedly secured to an upper portion of the upper leg portion 132. In the illustrated example, the mounting bracket 142 is welded to the upper leg portion 132, however other suitable connections may also be utilized. The mounting bracket 142 is secured to the mounting plate 124 via a plurality of mechanical fasteners such as bolts (not shown) that extend through mounting apertures 144.

The gear assembly 128 includes an input shaft 146 that receives an input from the drive assembly 130 as described below and that is coaxially aligned with an output shaft 148, where the output shaft 148 is coupled to an input shaft of the corresponding landing gear assembly located on an opposite side of the trailer 112. The gear assembly 128 also includes a first drive gear 150 in the form of a spur gear fixed for rotation with the input shaft 146, a first receiving gear 152 in the form of a spur gear engaging the first drive gear 150 and fixed for rotation with a secondary shaft 154 that is offset from the input shaft 146 and the output shaft 148. A second drive gear 156 in the form of a spur gear is fixed for rotation with the secondary shaft 154 and engages a second receiving gear 158 in the form of a spur gear that is fixed for rotation with the output shaft 148. A third drive gear 160 in the form of a bevel gear is fixed for rotation with the second receiving gear 158 and engages a third receiving gear 162 in the form of a bevel gear that is fixed for rotation with a longitudinally-extending, threaded spindle 164. In the illustrated example, the second receiving gear 158 and the third drive gear 160 are formed as a single and integral member. The input shaft 146 is pivotably mounted within the interior space 134 of the upper leg portion 132 via a pair of bushing members 168, while the secondary shaft 154 is pivotally mounted within the interior space 134 of the upper leg portion 132 via a pair of bushing members 170.

The upper leg portion 132 includes a bearing wall 72 fixedly mounted within an interior thereof via welding. The bearing wall 172 is sandwiched between the third receiving gear 162 and a bearing assembly 174 such that the spindle 164 is rotatably secured within the leg assembly 126. A lifting nut 176 is threadably mounted on the spindle 164 between a pair of bearing walls 178 fixedly secured within an interior of the lower leg portion 136 via welding, such that rotation of the spindle 164 in the direction 180 causes the lifting nut 176 to travel along the length of the spindle 164 thereby causing telescoping movement of the lower leg portion 136 within the upper leg portion 132 of the leg assembly 126.

Figure 13:
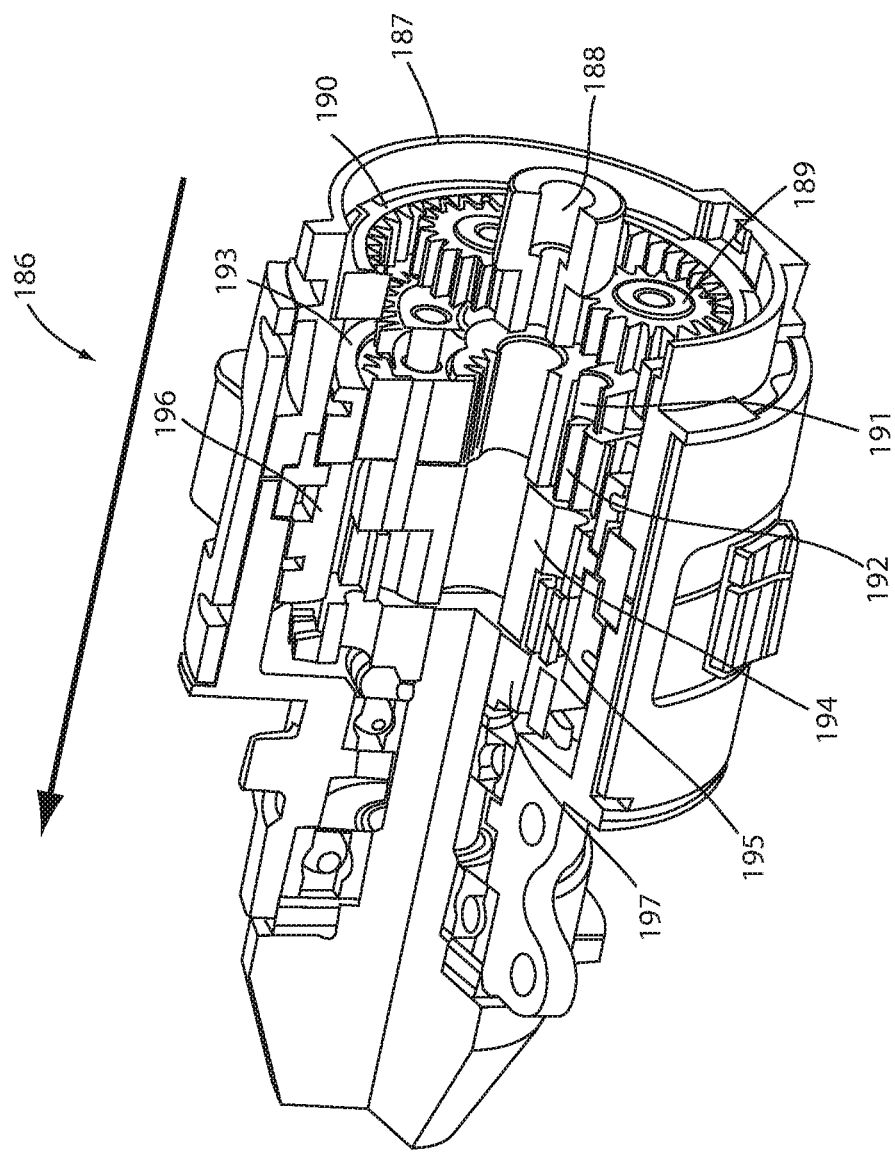
FIG. 13 is a cut-away perspective view of a planetary gear drive of the drive assembly of FIG. 11.

The drive assembly 130 includes an electric motor 182 powered by a battery 184, which in the present example includes a lithium battery. The drive assembly 130 further includes a planetary gear arrangement 186 driven by the motor 182. In the illustrated example, the gear arrangement 186 is operable between a first gearing ratio configuration where the gear arrangement 186 drives the gear assembly at a high first speed and low torque, and a second gearing ratio configuration where the gear arrangement 186 drives the gear assembly 128 at a low second speed and high torque. As best illustrated in FIG. 13, the planetary gear arrangement 186 includes a housing 187, a first sun gear 188 coupled with and driven by the motor 186, first stage planetary gears 189, a first ring gear 190, a second sun gear 191, second stage planetary gears 192, a second ring gear 193, a third sun gear 194, third stage planetary gears 195, a third ring gear 196, a fourth sun gear 197. In the low speed, high torque configuration, the motor 182 drives the first stage planetary gears 189 via the first sun gear 188, which in turn drives the second stage planetary gears 192 and the second sun gear 191, which in turn drives the third stage planetary gears 195 and the third sun gear 194, which in turn drives the fourth sun gear 197, which in turn drives the bevel drive gear 210, and wherein the first, second and third ring gears 190, 193, 196 are locked. In the high speed, low torque configuration, the second and third gears 193, 196 rotate with the second and third stage planetary gears 192, 195 while the first ring gear is fixed.

The drive assembly 130 may be coupled to the gear assembly 128 via an actuator arrangement 200. In the illustrated example, the actuator arrangement 200 includes an input gear 202 in the form of a spur gear and that is rotatably fixed to a driveshaft 204 that is rotatably supported within a housing 206 of the drive arrangement 130 via a pair of bushing members 208. A drive gear 210 in the form of a bevel gear is driven by the planetary gear arrangement 186 and engages a receiving gear 212 in the form of a bevel gear and that is fixed for rotation with the driveshaft 204. The input gear 202 is configured to engage and disengage an output gear 214 in the form of a spur gear, where the output gear 214 is fixed for rotation with the input shaft 146 of the gear assembly 128.

Figure 10:
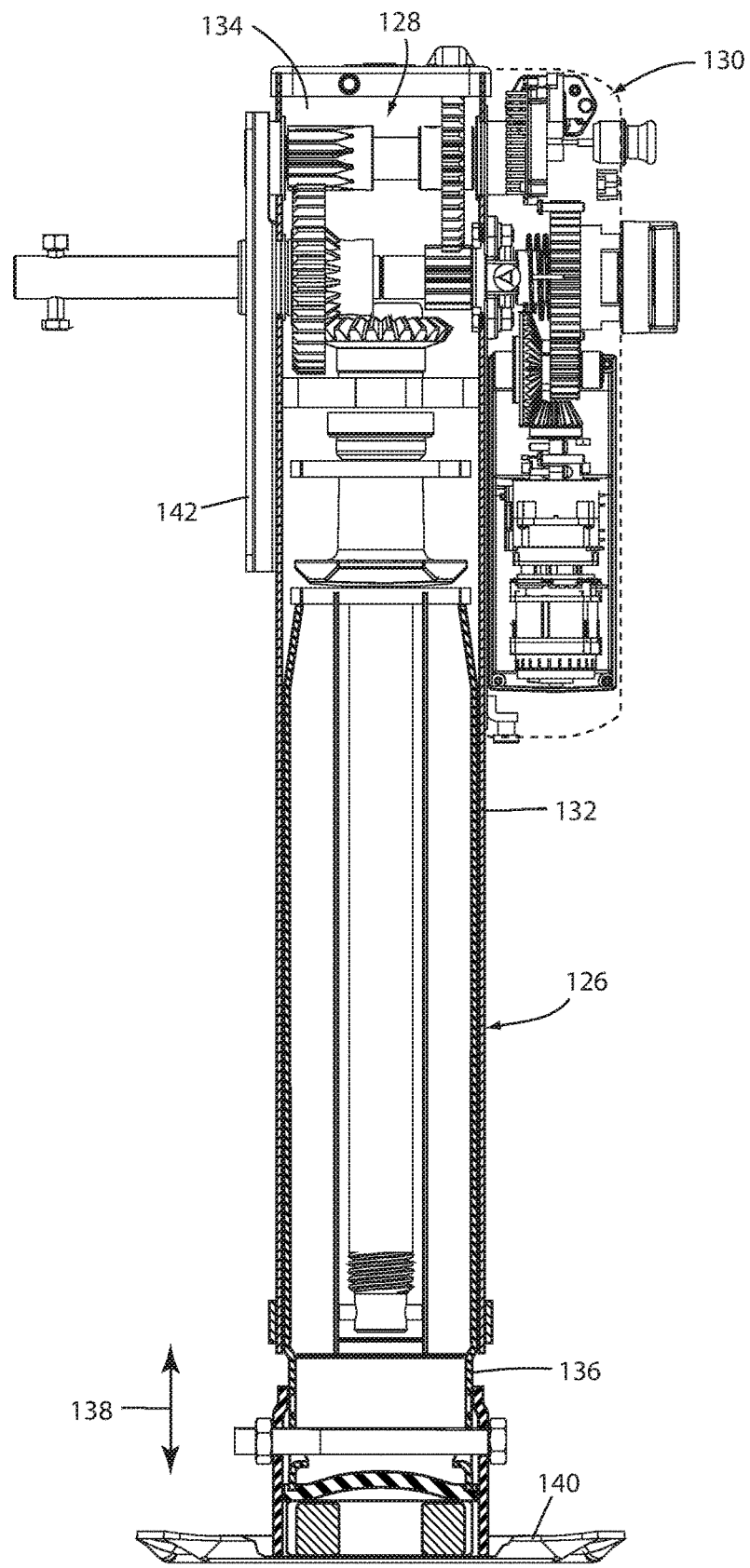
FIG. 10 is a cross-sectional, front elevation view of the landing gear assembly of FIG. 8.
Figure 11:
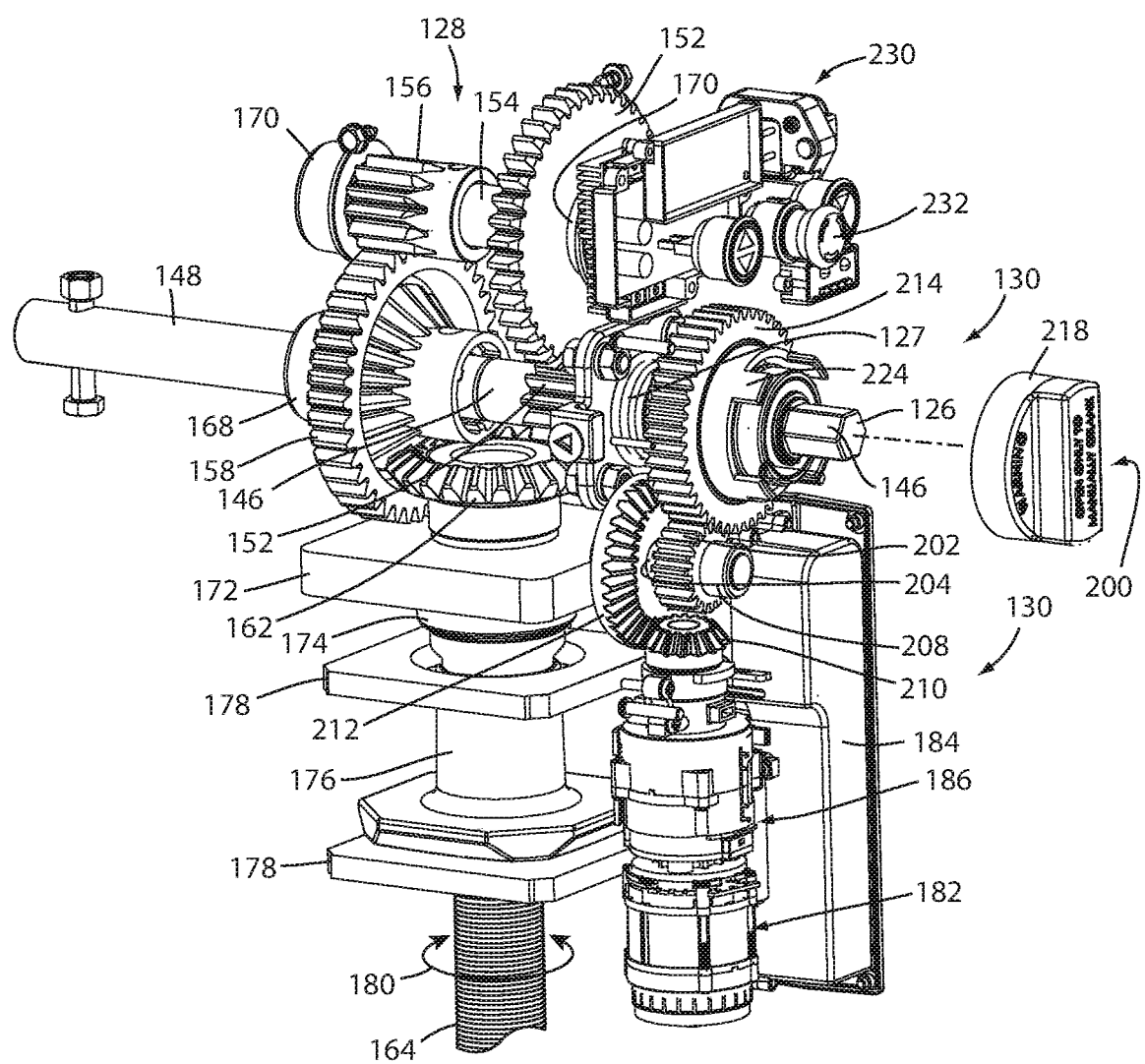
FIG. 11 is a perspective view of a gear assembly and a drive assembly of the landing gear assembly of FIG. 8.
Figure 12:
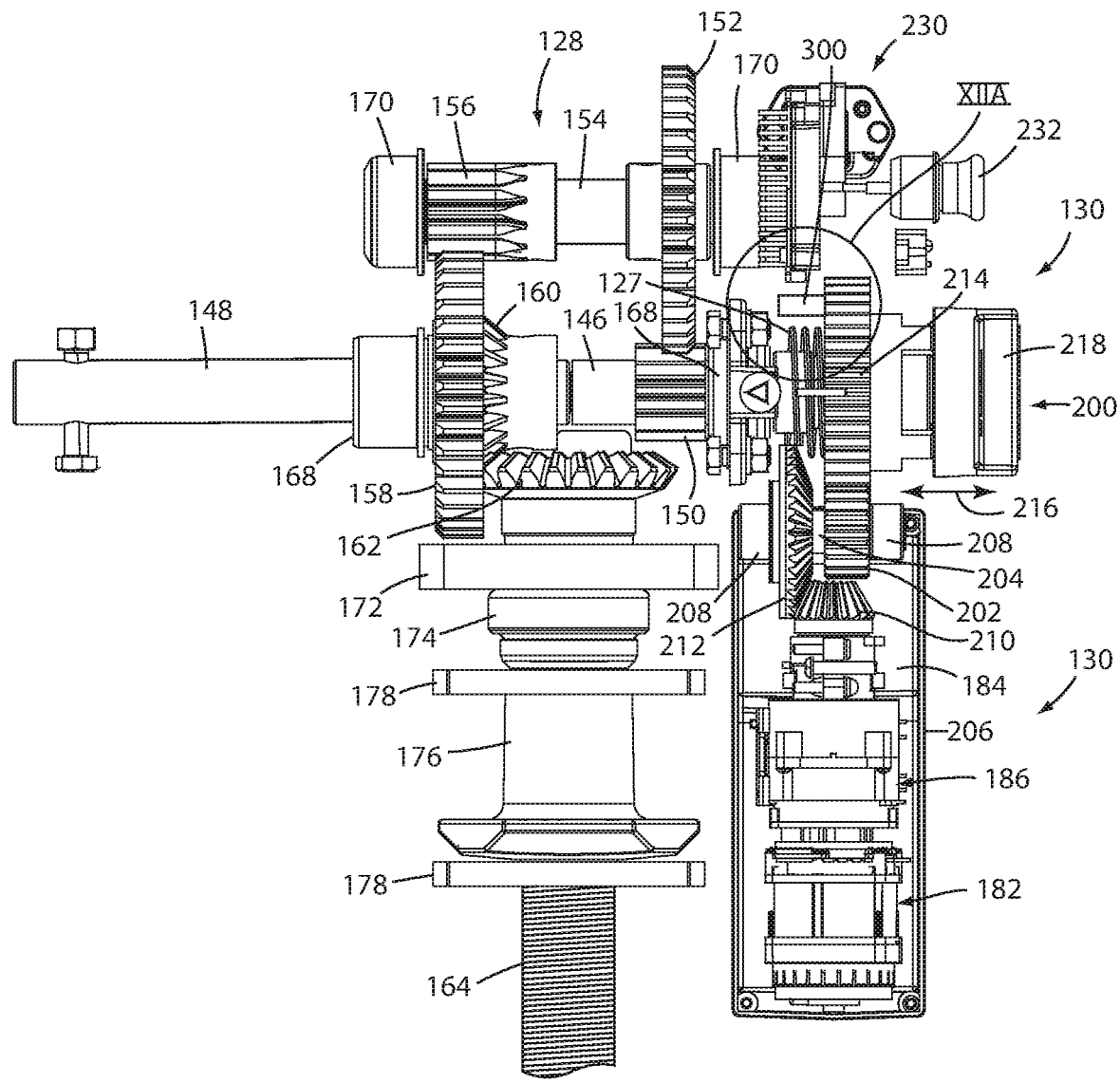
FIG. 12 is a front elevation view of the gear assembly and the drive assembly of FIG. 11.

In one embodiment of the actuator arrangement 200, the output gear 214 may be configured to be slidably displaced along a length of the input shaft 146 in a direction 216 between an engaged position where the input gear 202 engages the output gear 214 and the drive assembly 130 is coupled to the gear assembly 128, and a disengaged position where the output gear 214 is moved laterally outward from the engaged position such that the output gear 214 is offset from the input gear 202 and does not engage the input gear 202 and the drive assembly 130 is uncoupled from the gear assembly 128. In the illustrated example, the actuator arrangement 200 includes an actuator member 218 in the form of a cover 218. In the present example, the cover 218 is movable between an engaged or coupled position as shown in FIGS. 10 and 12, where the cover 218 prevents access to the input shaft 146, and a second or uncoupled/removed position as shown in FIG. 11, where a hexagonally-shaped end 126 of the input shaft 146 is accessible to an operator such that the operator can drive the landing gear assembly 110 via the manual handle 118 (FIGS. 1 and 2) or the hand tool 50 (FIGS. 5 and 6). In the present example, the cover 218 abuts a release ring 224, which in turn abuts the output gear 214 thereby forcing the output gear 214 laterally inward such that the output gear 214 engages the input gear 202. The actuator arrangement 200 further includes a spring member 127 that biases the output gear 214 from the engaged position to the disengaged position, such that when an operator removes the cover member 218, the spring member 127 biases the output gear 214 from the engaged position toward the disengaged position where the output gear 214 is disengaged from the input gear 202, thereby automatically uncoupling the drive assembly 130 from the gear assembly 128.

In operation, the trailer 112 may be uncoupled from a supporting towing vehicle by extending each of the landing gear assemblies 110 by actuating the motor 182 via an input extension button 236 of an interface. Electrical power from the battery 184 is then supplied to the motor 182 which drives the gear arrangement 186 which is in the first gearing ratio configuration. The gear arrangement 186 drives the gear assembly 128 via the actuator arrangement 200, thereby extending the lower leg portion 136 of the leg assembly 126 from the upper leg portion 132. It is noted that the current drawn by the motor 182 is relatively low as the lower leg portion 136 extends from the upper leg portion 132 and before the foot or supporting member 140 contacts the ground surface 120. Once the foot 140 abuts the ground surface 120 the landing gear assemblies 110 begin to support the load or weight of the trailer 112, thereby increasing the power required from the motor 182 and increasing the current drawn by the motor 182. The controller 230 is configured to switch the gear arrangement 186 from the first gearing ratio configuration to the second gearing ratio configuration once the current drawn by the motor 182 is elevated and maintained for a predetermined amount of time. In the present example, the controller 230 is configured to move the gear arrangement 186 from the first gearing ratio configuration to the second gearing ratio configuration after an increase in average current draw of preferably between about 50 percent and about 10,000 percent, more preferably between about 100 percent and about 1,000 percent, and most preferably about 300 percent, is maintained preferably for approximately 10 seconds and preferably for about 5 seconds. The controller 230 may be configured to pause the lifting cycle momentarily while the gear arrangement 186 is reconfigured from the first gearing ratio configuration to the second gearing ratio configuration before continuing the lifting cycle in the second gearing ratio configuration. Extension of the landing gear assembly 110 is then continued until a predetermined condition is reached, such as a predetermined extension amount, a vehicle level condition, and the like. Extension of the landing gear assembly 110 may also be terminated by the operator releasing the associated input button. The controller 230 may also be configured to turn the motor 182 off if the change in current draw by the motor 182 is maintained for a predetermined amount of time. In the present example, the controller is configured to shut the motor 182 off if a significant change in current draw has been maintained for about less than or equal to about one second, such as would occur during a malfunction where a component or subassembly of the landing gear assembly 110 is locked preventing extension retraction, and/or may be configured to shut off the motor 182 if minimal or zero current draw is maintained for approximately 30 seconds or a predetermined time of less than 30 seconds, thereby decreasing the possibility of damage to various components of the landing gear assembly 110. Coupling of the trailer 112 to an associated supporting towing vehicle may be accomplished in the reverse manner as described above. Specifically, the operator may actuate the motor 182 via the input extension button 232, of the interface where the motor 182 then drives the gear arrangement 186 in the second gearing ratio configuration, and the gear arrangement 186 drives the gear assembly 128 and telescopingly retracts the lower leg portion 136 into the upper leg portion 132 thereby lowering the trailer 112 onto the supporting vehicle. The gear arrangement 186 remains in the second gearing ratio configuration until the load or weight of the trailer 112 begins to be reduced, as by supporting of the towing vehicle. Once the trailer 112 begins to be supported by the supporting, towing vehicle, the power required by the motor 182 decreases, thereby causing a decrease in current draw by the motor 182. Similar to as described above, the controller 230 is configured to monitor the current draw from the motor 182, such that when the decrease in current draw by the motor 182 is maintained for a predetermined amount of time, the controller 182 reconfigures the gear arrangement from the second gearing ratio configuration to the first gearing ratio configuration. In the present example, the controller 230 is configured to switch the gear arrangement 186 from the second gearing ratio configuration to the first gearing ratio configuration once a decrease in current draw is maintained preferably for about 10 seconds, and more preferably for about 5 seconds. Again, as noted above, the controller 230 may be configured to pause driving of the gear arrangement 186 while the gear arrangement 186 is reconfigured from the second gearing ratio configuration to the first gearing ratio configuration. The gear arrangement 186 then continues operation in the first gearing ratio configuration and to retract the lower leg portion 136 into the upper leg portion 132 at the first speed. The lower leg portion 136 continues to be retracted into the upper leg portion 132 until a predetermined limit is reached, such as a height limit. The controller 230 may also be configured to shut the motor 182 off if the change in current draw is maintained for a predetermined amount of time. In the instant example, the controller 230 is configured to shut the motor 182 off if a significant change in current draw has been maintained for less than or equal to about one second, such as would occur during a malfunction where a component or subassembly of the landing gear assembly 110 is locked preventing retraction/extension, and/or may be configured to shut the motor 182 off if minimal or zero current draw is maintained for approximately 30 seconds or a predetermined time of less than 30 seconds, thereby reducing the possibility of inadvertent operation of the landing gear assembly 110 and/or reduce the possibility of damage to components of the landing gear assembly 110. An emergency shut off button 232 extends outwardly from the housing 206 and is configured to allow an operator to manually prevent operation of the motor 182 and consequently shut down the drive assembly 130 from extending and/or retracting leg assembly 126.

Figure 12A:
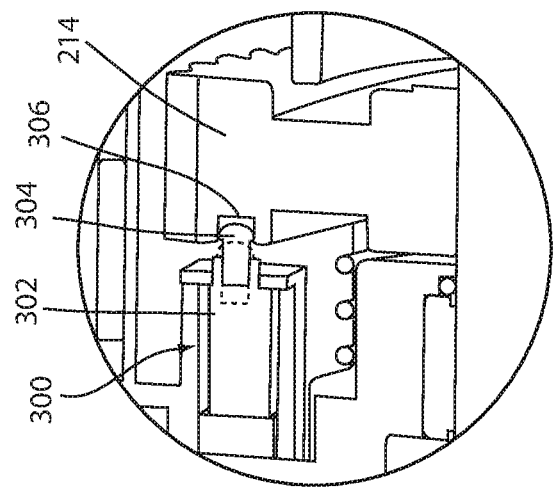
FIG. 12A is an enlarged view of the area XIIA, FIG. 12.

Creep of the landing gear assembly 110 from an extended position to a more retracted position while the landing gear assembly is supporting a load may be prevented by locking arrangement 300 (FIGS. 12 and 12A). In the illustrated example, the locking arrangement 300 includes a solenoid or electric actuator 302 configured to actuate a lock pin 304 between a retracted or unlocked position (shown in dashed) where the output gear 214 is free to rotate, and an extended or locked position (shown in solid) where the lock pin 304 engages a relief 306 of the output gear 214 thereby preventing the output gear 214 from rotating and thus the landing gear assembly 110 from retracting.

It is noted that while the present embodiment includes an extension/retraction control arrangement that is coupled to the overall landing gear assembly, external controls may also be utilized, including remotely located controls, e.g. controls associated with a towing vehicle or located within a cab of a towing vehicle, and/or wireless control arrangements configured to communicate with the controller 230 via Bluetooth®, and the like. Should the operator need to operate the landing gear assembly 110 via a manual input, for example, in instances where the battery 184 has an insufficient charge, or where the drive assembly 130 has malfunctioned, the operator may remove the cover 218. As noted above, removal of the cover 218 provides access to the hexagonally-shaped end 126 of the input shaft 146, thereby allowing the operator to attach a manual drive crank or handle 18 or external hand tool 50 to the end 126 of the input shaft 146. As noted above, removal of the cover 218 further allows the biasing spring 126 to move the output gear 214 from an engaged position where the output gear 214 is aligned and engages the input gear 202, to the disengaged position where the output gear 214 is offset from the input gear 202 and the drive assembly 130 is disengaged or uncoupled from the gear assembly 128.

Figure 14:
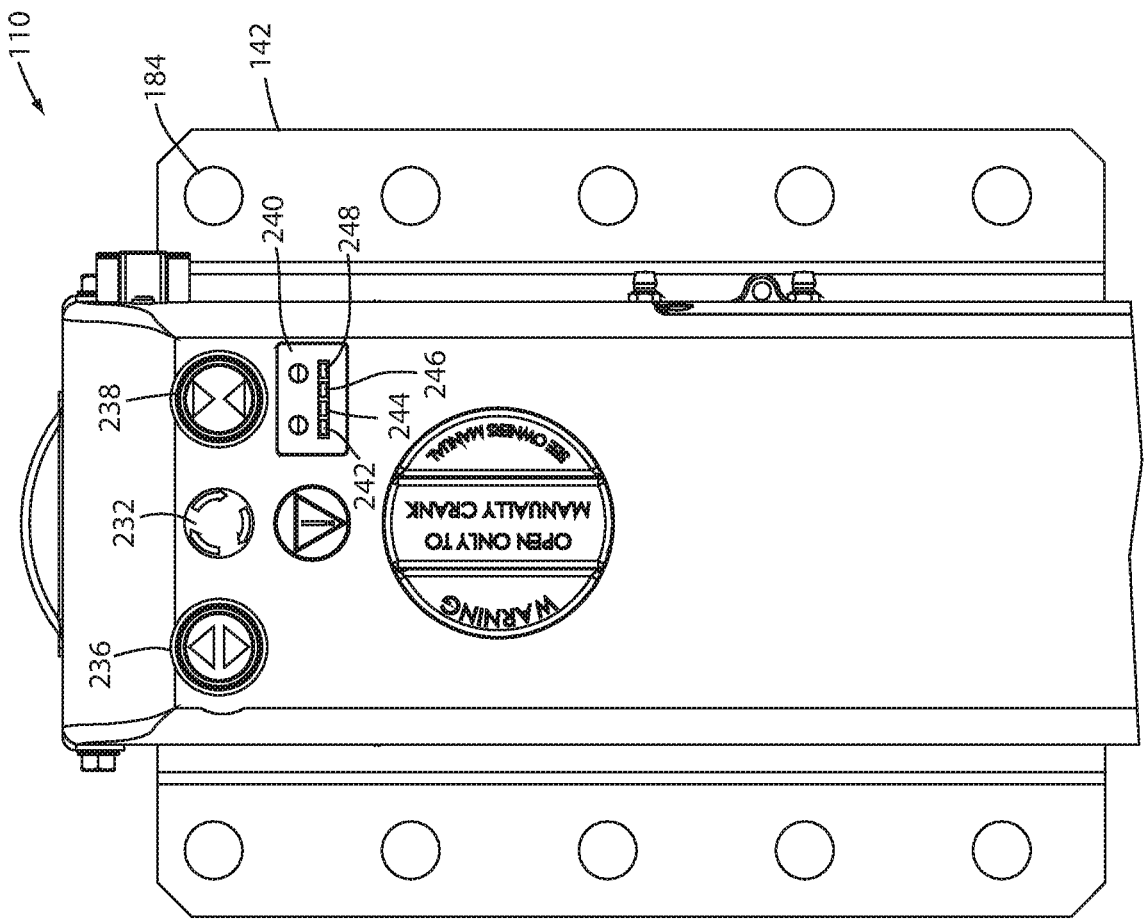
FIG. 14 is a side elevation view of the landing gear assembly of FIG. 8.

The landing gear assembly 110 (FIGS. 8 and 14) may also include a visual leg extension indicator integral with the input extension button 236, a visual leg retraction indicator integral with the input retraction button 238, and a battery status indicator 240. In the illustrated example, the leg extension indicator and the leg retraction indicator each include an LED, where the controller 230 is configured to light each of the indicators and convey to the operator the operation being conducted. In the illustrated example, the battery status indicator 240 includes a plurality of LED lights configured to visually convey to the operator the charging status of the battery 184. In the illustrated example, the battery status indicator 240 includes four LED lights, including a red LED 242, a yellow LED 244, a first green LED 246 and a second green LED 248, where the red LED 242 indicates a critically low battery charge, the yellow LED 244 indicates a depleted battery charge, the first green LED 246 indicates a moderate battery charge, and the second green LED 248 indicates a full or nearly full battery charge. The controller 230 may also be configured to utilize the LED lights 242, 244, 246, 248 to convey other information to the operator, such as a flashing pulse from the red LED 242 indicating a damaged battery.

It is noted that while the embodiments as disclosed herein include control arrangements requiring an operator to be in close proximity to the landing gear assembly or to the trailer or towing vehicle, other embodiments may include use of the landing gear assembly within remotely controlled and/or autonomous vehicles.

In the foregoing description, it will be readily appreciated by those skilled in the art that modifications may be made to the invention without departing from the concepts disclosed herein. Such modifications are to be considered as included in the following claims, unless these claims by their language expressly state otherwise.

The invention claimed is:

1. A landing gear assembly, comprising:
a leg assembly including a first leg portion and a second leg portion moveable with respect to the first leg portion;
a drive assembly including a motor configured to move the second leg portion with respect to the first leg portion;
a manual input receiver configured to receive a handle allowing manual movement of the second leg portion with respect to the first leg portion by an operator via the handle; and
an actuator arrangement movable by an operator between a first position where the motor is coupled with the leg assembly such that operation of the motor moves the second leg portion with respect to the first leg portion, and a second position the where the motor is uncoupled from the leg assembly such that operation of the motor does not move the second leg portion with respect to the first leg portion, and wherein the actuator arrangement includes an actuator member that covers the manual input receiver when in the first position, thereby preventing access to the manual input receiver and that is configured to allow access to the manual input receiver when in the second position.

2. The landing gear assembly of claim 1, wherein the actuator member is located in the first position such that that the actuator member couples the drive assembly with the first leg portion and the second leg portion, and the second position such that the actuator member does not couple the drive assembly with the first leg portion and the second leg portion.

3. The landing gear assembly of claim 2, wherein the actuator member includes a gear.

4. The landing gear assembly of claim 2, wherein the actuator member is spring biased toward the second position.

5. The landing gear assembly of claim 2, wherein the drive assembly includes a housing and the actuator member is removed from the housing when in the second position.

6. The landing gear assembly of claim 1, wherein the manual input receiver includes an input shaft.

7. The landing gear assembly of claim 6, further comprising:
a gear assembly configured to receive an input from the input shaft and operably coupling the input shaft with the first leg portion and the second leg portion.

8. The landing gear assembly of claim 7, wherein the gear assembly is a single-speed gear assembly.

9. The landing gear assembly of claim 8, wherein the drive assembly further includes a gear arrangement configured to operably couple the motor with the input shaft and provide an input to the input shaft.

10. The landing gear assembly of claim 9, wherein the gear arrangement is a multi-speed gear arrangement.

11. The landing gear assembly of claim 10, wherein the gear arrangement includes a planetary gear arrangement.

12. A landing gear assembly, comprising:
a leg assembly including an upper first portion and a lower second portion telescopingly received within the upper first portion between a retracted position and an extended position;
a gear assembly operably coupled to the first and second leg portions, and configured to telescopingly move the first and second leg portions with respect to one another between the retracted and extended positions, the gear assembly including an input shaft; and
a drive assembly coupled to the gear assembly, comprising:
a gear arrangement that includes a planetary gear arrangement configured to drive the input shaft of the gear assembly at a first speed and at a second speed that is different than the first speed as the leg moves from the retracted position to the extended position;
an electric motor configured to drive the gear arrangement gear assembly via the planetary gear arrangement;
a battery configured to provide power to the motor; and
a controller configured to move the gear arrangement between a first configuration where the gear arrangement operates at the first speed, and a second configuration where the gear arrangement operates at the second speed based on an electric current drawn by the motor.

13. The landing gear assembly of claim 12, wherein the battery includes a lithium battery.

14. The landing gear assembly of claim 12, wherein the gear assembly includes a first driving gear coupled for rotation with the input shaft, a first receiving gear engaging the first drive gear and coupled for rotation with a secondary shaft offset from the input shaft, a second drive gear coupled for rotation with the secondary shaft, a second receiving gear engaging the second drive gear, a third drive gear coupled for rotation with the second receiving gear and engaging a third receiving gear, wherein the input shaft is operably coupled with the planetary gear arrangement, and wherein the third receiving gear is fixed for rotation with a drive spindle operably coupled to the second portion of the leg assembly.

15. The landing gear assembly of claim 14, wherein the first drive gear, the first receiving gear, the second drive gear and the second receiving gear each include a spur gear.

16. The landing gear of claim 12, wherein the gear assembly is a single-speed gear assembly.

17. The landing gear of claim 12, wherein the controller is configured to move the gear arrangement between the first and second configurations when the current draw is maintained for greater than or equal to 5 seconds.

18. The landing gear assembly of claim 12, wherein the electric current draw by the motor includes a first electric current draw when the gear arrangement is moving at the first speed and a second electric current draw when the gear arrangement is moving at the second speed, and wherein the second electric current draw is between about 50 percent and about 10,000 percent greater than the first electric draw.

19. The landing gear assembly of claim 18, wherein the second current draw is between about 100 percent and 1,000 percent greater than the first current draw.

20. The landing gear assembly of claim 19, wherein the second current draw is 300 percent greater than the first current draw.

21. The landing gear assembly of claim 12, wherein the motor is located external to the first and second portions of the leg assembly.

\* \* \* \* \*